March 8, 1960 J. R. ANDERSON 2,928,075

FERROELECTRIC STORAGE CIRCUITS

Filed April 14, 1955

INVENTOR
J. R. ANDERSON
BY
ATTORNEY 2,928,075
Patented Mar. 8, 1960

2,928,075

FERROELECTRIC STORAGE CIRCUITS

John R. Anderson, Berkeley Heights, N.J., assignor to Bell Telephone Laboratories, Incorporated, New York, N.Y., a corporation of New York Application April 14, 1955, Serial No. 501,309

11 Claims. (Cl. 340—173)

Figure 1:
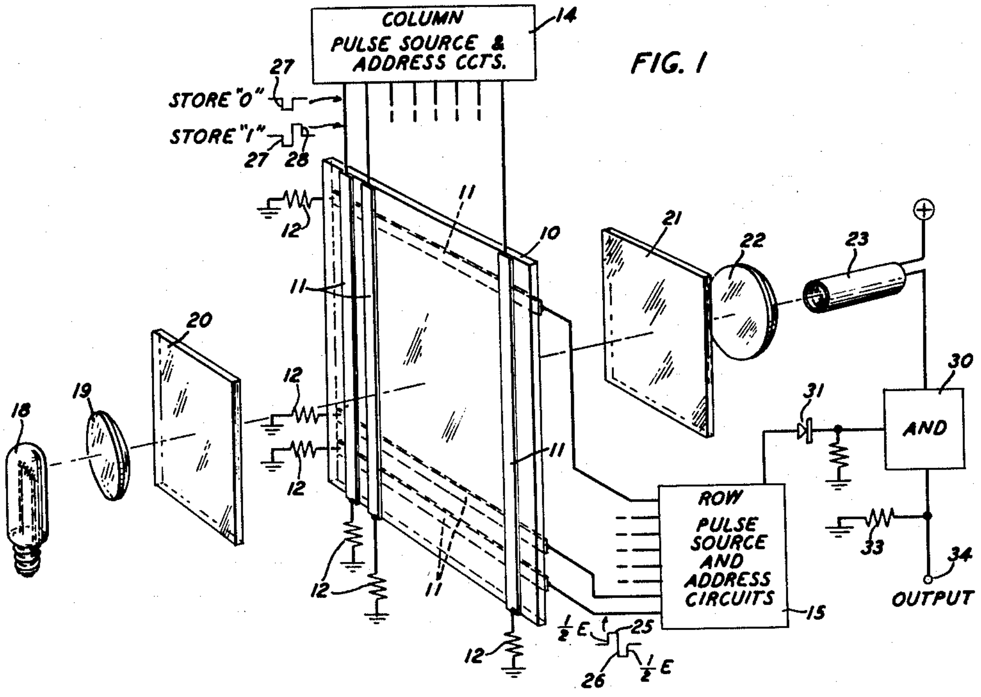

This invention relates to ferroelectric storage circuits and more particularly to the sensing of information stored in such circuits.

Two distinct types of systems for the storage of binary information have been developed which store the information by a remanent or residual internal state on removal of the external excitation. One of these employs magnetic cores having substantially rectangular hysteresis loops and in which the information is stored dependent on the state of residual magnetization of the material; the other of these, as fully described in Patent 2,717,372 issued September 6, 1955, to J. R. Anderson, employs condensers having dielectrics of a ferroelectric material and in which the information is stored dependent on the remanent state of polarization of the ferroelectric material.

Magnetic cores have been employed in large matrices with coordinate access circuits and a single readout wire threading all of the cores of the matrix; an output pulse appearing on this single read-out wire is then indicative of the prior state of magnetization, and thus of the information stored, of the single magnetic core that is being read out or sensed. Because only a single core has sensing pulses applied to it at a time by the access circuitry, the presence or absence of an output pulse on the single read-out wire can readily be associated with the information priorly stored in the core for which the address was applied to the access circuitry.

Priorly it has not been possible readily to employ a single read-out terminal or lead with a ferroelectric storage matrix. In magnetic core circuitry additional or output connections to the cores may easily be attained merely by threading additional wires through the cores or winding additional coils onto the cores, the only limitation being the physical size of the magnetic core. In ferroelectric circuits, however, there are but the two electrodes of the ferroelectric condenser and additional input or output electrodes cannot be applied. Accordingly, it is not possible to utilize a single common output terminal or electrode for all the storage condensers of a matrix. What would be required would be separate output circuits for individual rows or columns of the matrix and then an external OR circuit in which these would be combined.

It is a general object of this invention to provide an improved ferroelectric storage circuit.

It is another object of this invention to provide an improved circuit for obtaining an output pulse indicative of the information priorly stored in a ferroelectric memory or storage condenser.

It is a further object of this invention to provide a storage circuit including a matrix of ferroelectric condensers having a common output lead for all the condensers of the matrix, an output pulse appearing on the output lead on the switching of the state of the ferroelectric dielectric of any of the condensers of the matrix when sensing pulses are applied thereto.

It is a still further object of this invention to provide a circuit in which an output occurs on the switching of the state of any condenser of a ferroelectric storage matrix.

These and other objects of this invention are attained in specific embodiments thereof by employing a light read-out. Ferroelectric materials, along with various piezoelectric and other materials, have the ability to transmit polarized light and to alter the direction or angle of polarization of the light dependent on externally applied influences. A ferroelectric employed as a storage dielectric has its dipoles oriented in what is generally referred to as *c*-domains. These *c*-domains will normally transmit polarized light without altering its polarization as the light is transmitted along the *c* or optic axis of the material. The so-called *a*-domains, which occur when the dipoles are oriented at right angles to the *c*-domains, will rotate the direction of polarization of the transmitted light. However, *a*-domains do not occur in ferroelectrics employed in storage condensers. Further, when a *c*-domain ferroelectric is shifted from one state of remanent polarization to the opposite, the dipoles shift from *c*-domains in one direction to *c*-domains in the other direction without rotation of the domains through an intermediate *a*-domain state. The switching of the *c*-domains during the operation of the ferroelectric storage condensers is further discussed in an article "Domain Formation and Domain Wall Motions in Ferroelectric $BaTiO_3$ Single Crystals," Physical Review, vol. 95, No. 3, p. 690 (August 1, 1954) by W. J. Merz. It should be pointed out that this shifting of the *c*-domains of the ferroelectric material is in contradistinction to the ferromagnetics wherein the domains do rotate or move sideways when a magnetic field is applied.

Accordingly, in either state of remanent polarization the ferroelectric material is in a *c*-domain which transmits polarized light without rotation of the direction of polarization of the light, and during the switching operation the material remains in its *c*-domains, though the direction of the domains reverses. There is, however, another electrooptical effect that is known and because of which light-transmitting materials can be made to rotate the axis of the polarized light; this is known as strain-induced birefringence. The prior practice has been to apply an external electric field to such materials to induce the strains and thus render the material capable of rotating the axis of polarization of the transmitted polarized light.

However, I have discovered that when the dipoles of a ferroelectric material are switched, so that the orientation of the *c*-domains is reversed, the ferroelectric is internally strained and the polarized light transmitted through it during the switching interval has its axis of polarization rotated; this is a strain-induced birefringence dependent on the switching of the domains and not on applying an external electric field to the *c*-domain crystal. As the domains are switched, the electric field applied to the ferroelectric condenser is much smaller than that required to observe a strain-induced birefringent effect due solely to externally applied fields. Actually only the electric fields normally applied to switch the state of the ferroelectric need be utilized as the strains are introduced solely during and because of the switching of the material.

In accordance with an aspect of this invention, this optical effect is utilized for an optical or light read-out of ferroelectric storage systems and matrices. In one specific embodiment of this invention, parallel rays of light polarized along one axis or angle are simultaneously applied to one side of a ferroelectric storage matrix which employs light transparent electrodes. When the information stored in a single storage condenser of the matrix is to be sensed, a read-out pulse or pulses are applied to that condenser; if the information priorly stored in the condenser is such that the state of polarization of the ferroelectric material forming the dielectric of that condenser is to be switched, then the light transmitted through that condenser on the switching of the direcion of the c-domains will have its axis of polarization rotated, due to the internal strains introduced, as described above. This light passes through a polarizer or analyzer and is focussed onto a light sensitive detecting element, such as a photocell or phototransistor, to cause a voltage to appear at a single output terminal common to all the storage condensers of the matrix. The analyzer is oriented so as to pass polarized light only if the initial axis of polarization of the light has been changed by the ferroelectric material.

As only a single condenser is sensed at any time, in accordance with address information applied to the access and pulsing circuits, the presence or absence of a pulse at the common output terminal is indicative of the state of only that particular condenser. In this manner an output arrangement, similar to the single output wire of magnetic core memory matrices, is attained, without utilizing a single electrode or lead which is directly in contact or associated with each of the storage elements of the matrix, as is possible in magnetic core matrices but not possible in ferroelectric matrices for the reasons discussed further above.

If desired, the light read-out pulse, appearing at the common output terminal, may be utilized merely as a check pulse or an indication that some information had priorly been stored in one or more condensers in the matrix or in a particular row in the matrix and information read-out pulses obtained from individual output terminals, as has priorly been done. Thus the output circuitry of Patent 2,717,373 issued September 6, 1955, to J. R. Anderson, may be utilized together with a light read-out, the light read-out pulse indicating to check or other circuitry whether any information had priorly been stored in any of the storage condensers of the row being read out at that time.

In order that an output appear at the common output terminal of the photoelectric read-out circuit only when a ferroelecric condenser is being switched on sensing and not on the storing of information, an AND gate may be utilized between the output terminal and the photosensitive device, the gate being enabled only during the sensing of information in the ferroelectric matrix.

It is a feature of this invention that information stored in a ferroelectric storage condenser be sensed by applying light to the condenser.

It is a further feature of this invention that information stored in a ferroelectric storage condenser be sensed by applying light to the condenser, a detection circuit being utilized for determning the prior state of remanent polarization of the ferroelectric material and being responsive to the application of the light beam to the condenser.

It is a still further feature of this invention that the information be sensed by detecting the transmission of light through a ferroelectric condenser on the switching of the state of polarization of the ferroelectric dielectric of the condenser.

It is another feature of this invention that the information stored in a ferroelectric condenser be sensed by reversing the state of polarization of the material while at the same time applying a beam of polarized light to the material through light transmitting electrodes, a light detection circuit detecting the rotation of the axis of polarization of the light transmitted through the material due to strain-induced birefringence occurring while the c-domains of the ferroelectric material are being switched.

It is a still further feature of this invention that a matrix of ferroelectric storage condensers have a common output terminal at which an output pulse appears indicative of the information stored in any one of the condensers of the matrix.

It is still another feature of this invention that a slab of a ferroelectric material have a plurality of light transmitting electrodes on opposite sides thereof, a source of parallel rays of light polarized in one direction or angle being positioned to one side of the slab and an arrangement for focusing light transmitted through the slab and polarized in a different direction or angle onto a single light sensitive element being positioned to the other side of the slab, whereby only light transmitted through the slab of ferroelectric material on the switching of the direction of the c-domains of the ferroelectric material of the dielectric of any one of the condensers defined by the electrodes on the slab of ferroelectric material is focussed on the light sensitive element.

Figure 2:
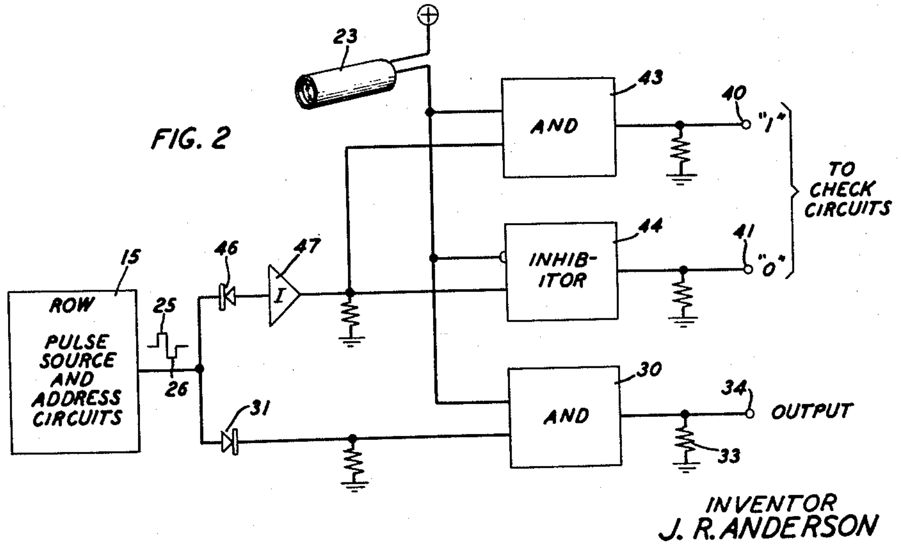

A complete understanding of these and various other features of this invention may be gained from the following detailed description together with the accompanying drawing, in which:

Fig. 1 is a perspective view, mainly in diagrammatic and block diagram form, of one specific illustrative embodiment of this invention; and Fig. 2 is a block diagram representation of a modified output circuit for the embodiment of Fig. 1.

Referring now to the drawing, Fig. 1 depicts one specific illustrative embodiment of this invention. As there seen, a single slab 10 of a ferroelectric material, such as barium titanate, has a plurality of electrodes 11 aligned in parallel on opposite sides of the slab 10. One group of electrodes are depicted vertically and will be referred to as the column electrodes; the other group of electrodes which are depicted horizontally will be referred to as the row electrodes. Each electrode is advantageously grounded as through a resistor 12.

The positioning of the electrodes and the application of partial sensing and storing pulses thereto for switching the state of polarization of an elemental storage condenser defined by the spatial intersection of a single row and a single column electrode, on opposite sides of the slab 10, may be generally as described in Patent 2,717,373 issued September 6, 1955 to J. R. Anderson. However, in the embodiment of this invention depicted in Fig. 1, information is to be read out or sensed in individual condensers at a time, rather than from a whole row at a time.

Specifically in the embodiment depicted in Fig. 1, column and row pulse source and address circuits 14 and 15, respectively, are employed to determine the particular storage condenser in which information is to be stored or from which information is to be read out, as well as to apply the storage and sensing pulses to the electrodes 11 common to that condenser. In accordance with the teaching of Patent 2,717,373 issued September 6, 1955, to J. R. Anderson, partial pulses are applied by the circuits 14 and 15 to the column and row electrodes, the pulses individually being insufficient to switch the state of polarization of the ferroelectric material between the electrodes but when occurring together being of sufficient voltage amplitude to effect the switching.

The address circuits 14 and 15 may provide for either random access to the memory defined by the slab 10 and the electrodes 11 or for a constant scanning of the memory. If desired, regeneration circuits, of the type known in the ferroelectric storage art, may be utilized to restore the information if the memory is constantly scanned.

Positioned to one side of the ferroelectric storage matrix are a source of light 18, which may be a lamp as depicted in the drawing, a collimating lens 19, and a polarizer 20. Light from source 18 is thus formed by the collimating lens 19 into a beam having substantially parallel rays, which is thereafter polarized in one coordinate by the polarizing film or plate 19 and caused to be incident over the entire surface of the ferroelectric slab 10. Positioned to the other side of the ferroelectric storage matrix are a second polarizer or analyzer 21, a condensing lens 22, and a light detecting element 23, such as a photocell or phototransistor. The light on emerging through the ferroelectric slab 10 is normally blocked by the polarizing film or plate 21, which passes only light polarized in a coordinate at 90° from that of the polarizer 20; however, if the light transmitted through the ferroelectric slab 10 has had its direction of polarization rotated, as discussed further below, so as to pass through the analyzer 21, it is then focussed by the lens 22 on the light sensitive surface of the photodetector 23.

Advantageously the electrodes 11 are transparent to light so that the polarized light from the polarizer 20 is enabled to pass directly through the ferroelectric condensers defined between the row and column electrodes 11 on opposite sides of the slab 10. The electrodes 11 may be of thin films of gold, of alloys of aluminum, titanium, and gold, as described in the W. L. Bond et al. Patent No. 2,842,463 issued on July 8, 1958, or the other materials having relatively low electrical resistances and relatively high values of optical transmission which are known in the art.

Let us consider now the operation of the specific illustrative embodiment of this invention depicted in Fig. 1. The row pulse source and access circuits 15 always apply to the electrode 11 defining the condenser from which information is to be read and in which information is then to be stored, a positive pulse 25 followed by a negative pulse 26 each of an amplitude ½ E where E is the voltage required to switch the state of polarization of the ferroelectric material. If a "0" is to be stored in the particular condenser after read-out of the priorly stored information, the column pulse source and address circuits 14 merely apply a negative pulse 27 of ½ E to the other electrode 11 defining the condenser, the negative pulse being coincident in time with the positive pulse 25 and together comprising a sufficient voltage to switch the state of the ferroelectric material. However, if a "1" is to be stored in the condenser immediately after read-out of the priorly stored information, the negative pulse 27 is followed by a positive pulse 28, also of magnitude ½ E, pulse 28 being applied coincident with pulse 26.

When a pulse 25 and a pulse 27 are simultaneously applied from circuits 14 and 15 to the electrodes 11 of a condenser in which a "1" had priorly been stored, the state of polarization of that condenser will be switched and the light transmitted through that discrete portion of the ferroelectric slab 10 utilized as the dielectric of that condenser will have its axis of polarization rotated because of an internally induced strain birefringence, as described above. This light will be transmitted through the analyzer 21 and be detected by the photosensitive element or cell 23 which applies a positive pulse to an AND gate 30, which may comprise semiconductor diodes, as is known in the art. The other input of the AND gate 30 is the positive sensing pulse 25 from the circuit 15 which is applied to the AND gate through a diode or other unidirectional current element 31; thus the gate 30 is enabled only during the sensing cycle of the system and no output pulses can appear across the resistance 33 and at the output terminal 34 during the switching of the state of polarization of the ferroelectric material of any of the condensers on the storing of information in the condensers.

If a "1" is then to be stored back in that particular condenser, the ferroelectric material of that condenser has applied to it the coincident pulses 26 and 28; however, as diode 31 is poled for passage only of positive pulses, AND gate 30 is not enabled and no output can appear at the terminal 34 due to the transmission of light through the ferroelectric slab 10 and analyzer 21 at this time. It is apparent that, if semiconductor diodes are utilized in the AND gate 30, the diode 31 may be superfluous and can be omitted; it has been depicted in the drawing, however, to facilitate a visual understanding of this aspect of my invention.

I have found that relatively thin barium titanate single crystals, as of the order of one mil thickness or less, are most advantageously employed in light sensing and readout circuits in accordance with my invention, though other types of ferroelectric materials and other sizes of crystals may also be employed.

Referring now to Fig. 2, there is depicted a modified photo-output circuit in which not only is an output pulse produced at the output terminal 34 on the sensing of information stored in any of the ferroelectric condensers, as described above, but output pulses are also produced at one or the other of the check output terminals 40 and 41 on the storing of information in any condenser in the storage matrix, a pulse appearing at output terminal 40 if a "1" has been stored and an output appearing at terminal 41 if a "0" has been stored. Terminals 40 and 41 may advantageously be connected to check circuits, of various types known in the art, for comparison with the input information applied to the address and pulse source circuits 14 and 15.

The photosensitive element 23 is connected to the AND circuit 30, as in Fig. 1, but also to an AND circuit 43 and an inhibiting circuit 44. The other input to each of these circuits is from the pulse source and address circuit 15 but through a diode 46 poled for passage therethrough of only the negative or partial store pulse 26. An inverter 47, which may comprise merely a polarity reversing transformer or other circuit known in the art, changes the negative pulse 26 to a positive pulse for application to circuits 43 and 44.

If a "1" is being written in a condenser in the matrix, the state of polarization of the ferroelectric defining the dielectric of that condenser is being switched and, because of the resultant strain-induced birefringence during the switching action, light will be transmitted through the slab 10 and analyzer 21 and detected by the element 23. Accordingly, a positive pulse is applied to enable the AND gate 43, causing an output pulse to appear at terminal 40, and to inhibit gate 44. Similarly, if a "0" is to be stored, the light transmitted through the ferroelectric slab will not pass through the analyzer 21; accordingly, gate 43 is not enabled and circuit 44 not inhibited, thereby causing an output pulse to appear only at terminal 41.

Advantageously the optical system and ferroelectric storage matrix are positioned in a light tight box or otherwise mounted so that no external light is incident on the optical circuit, the sole light source being the lamp or other source 18.

It is to be understood that the above-described arrangements are illustrative of the application of the principles of the invention. Numerous other arrangements may be devised by those skilled in the art without departing from the spirit and scope of the invention.

What is claimed is:

1. An electrical circuit comprising a storage condenser having a dielectric of a ferroelectric material and a pair of electrodes, means for storing signal information in said condenser comprising means for applying first pulses to said condenser to leave said ferroelectric material in a selected state of remanent polarization, and means for sensing the information stored in said condenser, said sensing means comprising means for applying a beam of light to said condenser concurrent with the application of second pulses from said pulse applying means to said condenser, detection circuit means responsive to the application of said light to said condenser for determining the prior state of remanent polarization of said ferroelectric material, and means connected to said pulse applying means for enabling said detection circuit means to provide an output signal concurrent with the application of said second pulses to said condenser.

2. An electrical circuit in accordance with claim 1 wherein said ferroelectric material is barium titanate, 3. An electrical circuit comprising a storage condenser having a dielectric of a ferroelectric material and a pair of electrodes, means for applying pulses to said electrodes to switch the state of polarization of said ferroelectric material, a source of light positioned to one side of said condenser, light detection means positioned to the other side of said condenser for detecting the transmission of light through said condenser, output gating means connected to said light detection means and said pulse applying means for providing an output signal upon coincident receipt of signals from said light detection means and said pulse applying means, and means for enabling said light detection means only on the switching of the state of polarization of said material.

4. An electrical circuit comprising a storage condenser having a dielectric of a ferroelectric material and a pair of light-transmitting electrodes, means for storing signal information in said condenser comprising means for applying pulses to said electrodes to leave said ferroelectric material in one state of remanent polarization, and means for sensing said information stored in said condenser, said sensing means comprising means for reversing the state of remanent polarization of said material, means for applying a beam of polarized light onto one side of said condenser, and light detection means positioned to the other side of said condenser for detecting the transmission of polarized light through said condenser only as said material reverses its state of polarization.

5. An electrical circuit in accordance with claim 4 wherein said polarized light is continuously applied to said condenser and said light detection means further comprises gating means operated only during the sensing of the information stored in said condenser.

6. A storage circuit comprising a plurality of ferroelectric storage condensers arranged in an array, means for storing information in any of said condensers in said array, said storing means comprising means for applying pulses to said condensers to determine the remanent state of polarization of said ferroelectric condensers, means for sensing information stored in any of said condensers, said sensing means including means for applying a beam of light to all of said condensers in said array, detection circuit means comprising a photo-sensitive element responsive to the application of said light beam to said condensers, gating means connected to said photosensitive means, and means connected to said pulse applying means for enabling said gating means upon the application of said determining pulses to said condensers.

7. A storage circuit comprising a plurality of condensers each having a dielectric of a ferroelectric material, said condensers being electrically arranged in an array, means for storing information in said condensers, said storing means including means for applying pulses to said condensers to leave said ferroelectric material of any of said condensers in one state of remanent polarization, and means for sensing that information has been stored in any condenser in said array, said sensing means including means for applying pulses to said condensers to leave the ferroelectrtic material of said condensers in the opposite state of remanent polarization, means for applying light polarized in one direction to one side of all of said condensers, means positioned to the other side of said condensers for detecting the transmission of said light polarized in another direction through any of said condensers, and means effective upon the switching of the polarization of said ferroelectric material from said one to said other state of remanent polarization to enable said detecting means.

8. A storage circuit comprising a plurality of condensers each having a dielectric of a ferroelectric material and a pair of light-transmitting electrodes, means for applying pulses to said electrodes to switch the state of polarization of said ferroelectric material of said condensers, a source of polarized light positioned to one side of all of said condensers, and light detection means positioned to the other side of all of said condensers for detecting the transmission of light through any one of said condensers only on the switching of the state of polarization of said material of said one condenser.

9. A ferroelectric storage circuit comprising a slab of a ferroelectric material, a plurality of light-transmitting electrodes on opposite sides of said slab and defining a plurality of storage condensers, means for storing information in any of said condensers, comprising means for applying pulses to said electrodes to determine the remanent state of polarization of the ferroelectric material in one state, and means for sensing that information has been stored in any of said condensers, said sensing means comprising means for applying a beam of light polarized in one direction to one side of said slab and means positioned to the other side of said slab for detecting the transmission of light through any of said condensers polarized in another direction.

10. A ferroelectric storage circuit comprising a slab of a ferroelectric material, a plurality of light transmitting electrodes on opposite sides of said slab and defining a plurality of storage condensers, means for applying pulses to said electrodes to switch the state of polarization of the ferroelectric material comprising the dielectric of any of said condensers, a source of polarized light positioned to one side of said slab, and light detection means positioned to the other side of said slab for detecting the transmission of light through any one condenser only on the switching of the state of polarization of said one condenser.

11. A ferroelectric storage circuit comprising a slab of a ferroelectric material, a plurality of light-transmitting electrodes on opposite sides of said slab and defining a plurality of storage condensers, means for storing information in any of said condensers, said storing means comprising means for applying pulses to said electrodes to determine the remanent state of polarization of the ferroelectric material of any of said condensers in one state, and means for sensing that information has been stored in any one of said condensers, said sensing means including means for applying pulses to said electrodes to determine the remanent state of polarization of the ferroelectric material in the opposite state, means for applying a beam of light to one side of said slab, means positioned to the other side of said slab for detecting the transmission of light through any one of said condensers only on the switching of the remanent state of polarization of the ferroelectric material of said one condenser, and gating means connected to said detecting means and to said pulse applying means and operated only when information is to be sensed.

References Cited in the file of this patent

UNITED STATES PATENTS

| | | |
|---|---|---|
| 2,179,098 | Mason | Nov. 7, 1939 |
| 2,277,007 | Von Ardenne | Mar. 17, 1942 |
| 2,485,839 | O'Dea | Oct. 25, 1949 |
| 2,560,430 | Friend | July 10, 1951 |
| 2,649,027 | Mason | Aug. 18, 1953 |
| 2,691,738 | Matthias | Oct. 12, 1954 |
| 2,717,372 | Anderson | Sept. 6, 1955 |
| 2,717,373 | Anderson | Sept. 6, 1955 |
| 2,793,288 | Pulvari | May 21, 1957 |

OTHER REFERENCES

"Ferroelectrics for Digital Information Storage and Switching" (Buck), Report R-212 of the Digital Computer Laboratory M.I.T., June 5, 1952 (pages 18 to 25 and Fig. 23 relied upon).

"The Snapping Dipoles of Ferroelectrics as a Memory Element for Digital Computers" (Pulvari), Proceedings of Western Computer Conference, Feb. 4–6, 1953 (pages 150 to 153 and 158 relied upon), published June 1953.